Patented Nov. 14, 1944

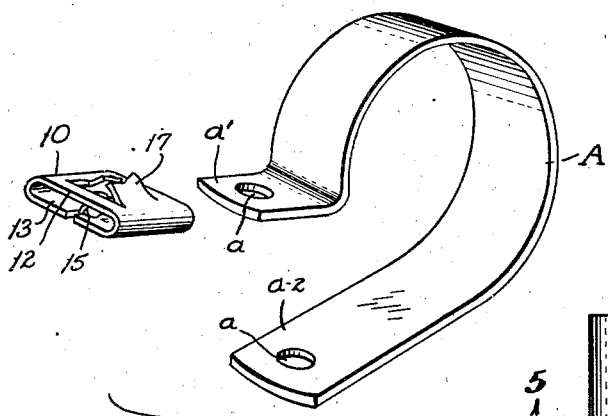
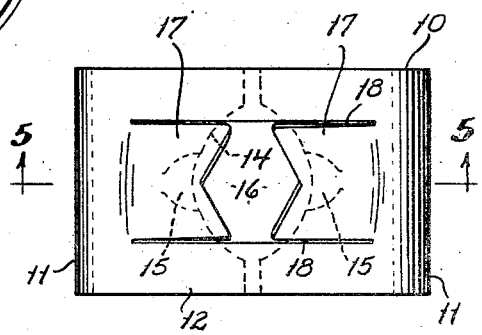
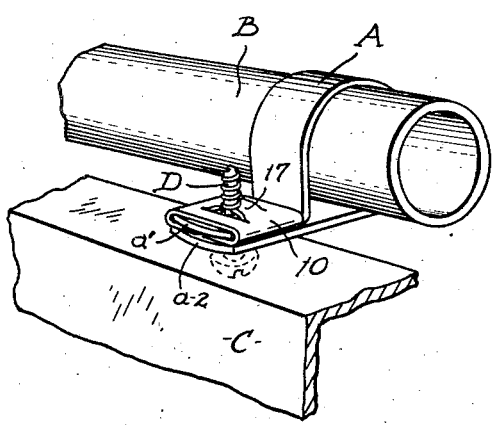
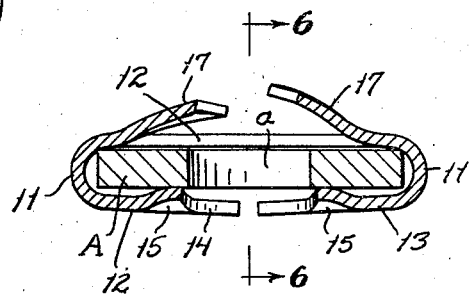
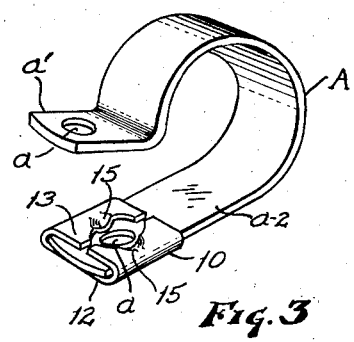
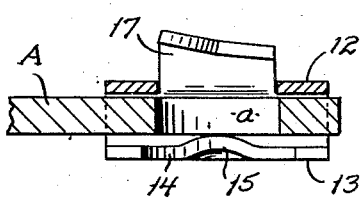

2,362,679

UNITED STATES PATENT OFFICE 2,362,679

FASTENING DEVICE

George A. Tinnerman, Cleveland, Ohio, assignor to Tinnerman Products, Inc., Cleveland, Ohio, a corporation of Ohio Application February 16, 1943, Serial No. 476,093

3 Claims. (Cl. 85—36)

This invention is concerned with a fastening device formed to embrace an arm or other member having a bolt opening and hold itself in place thereon, the device being provided with an opening adapted to register with the opening in the embraced member and having thread-engaging means to coact with a bolt passing through the registering openings. A particular object of the present invention is to provide means formed integrally with the fastening device for automatically holding it in place on the embraced member.

More specifically, the fastener of the present invention comprises a clip made of a strip of sheet material deformed in an intermediate region about an opening through it to provide thread-engaging means, two end portions of the strip being doubled toward each other into position more or less parallel with the intermediate region and each formed with a projection to frictionally engage the member embraced to hold the fastener effectively in place on such member.

The invention in the present application is in the nature of an improvement on the fastening clip shown in my pending application Serial No. 442,335, filed May 9, 1942, but differs therefrom in that in the present invention the projections adjacent the ends of the doubled-in portions frictionally engage the face of the embraced arm, whereas in the clip of the prior application the projections are formed to extend into the opening in the arm. It results from this difference that in the present invention the opening through the arm need be no larger than required for the passage of a bolt which is an advantage in allowing the use of the clip with arms having existing bolt holes, avoiding the extra work of enlarging the hole and any resultant weakening of the arm.

My fastener is illustrated in the drawing hereof and is hereinafter more fully explained in the following detailed description of the parts shown in the drawing.

In the drawing, Fig. 1 is a perspective of my fastening device associated with a clamping strap on which the device is ready for mounting; Fig. 2 is a perspective showing a conduit secured to a suitable support by means of the strap and fastener of Fig. 1 and the insertion of an attaching screw; Fig. 3 is a perspective illustrating my fastening clip inverted from the position of Fig. 1 and mounted on the other arm of the conduit strap; Fig. 4 is a plan on a larger scale of the fastening device itself; Fig. 5 is a longitudinal section thereof in a plane indicated by the line 5—5 on Fig. 4 and showing the device mounted on an embraced arm; Fig. 6 is a transverse section of the fastener and embraced arm in the plane indicated by the line 6—6 on Fig. 5.

The fastener designated 10 as a whole is made of a single strip of sheet material doubled on itself in two intermediate regions designated 11 to provide what may be called an upper intermediate portion 12 and two under portions 13 aligned with each other but separated and arcuately recessed as at 14 to provide for the passage of the bolt. These under portions are provided with upwardly extending lugs 15 which form the locking means when the fastener is mounted, as hereinafter explained.

The intermediate or top portion 12 has an opening 16 for the passage of the bolt and is deformed about the opening to provide thread-engaging means. In the form shown this deformation comprises the provision of two inclined tongues 17 on opposite sides of the opening. These tongues are made by making the opening 16 of approximately diamond shape and cutting two parallel longitudinal slits 18 crossing and forming the boundaries for said opening. Then the tongues are bent upwardly and warped in opposite directions indicated in Figs. 2 and 3 to bound a helical turn and thus provide the thread-engaging means.

The present invention is concerned particularly with the means on the two under portions 13 of the fastener for frictionally engaging the embraced member and thereby holding the fastener in place.

As shown, the lugs 15 which provide frictional engaging means are made by bowing upwardly comparatively small central regions adjacent the extreme ends of the under portions 13 of the clip. These upward bends are quite gradual and rise a comparatively short distance from the upper face of the under portions 13 but are adapted to engage the embraced member with sufficient force to hold the clip in place thereon. This is clearly illustrated in Figs. 5 and 6, where A indicates the arm embraced. As may be seen, the lugs 15 are near the bolt opening a of the arm but do not encroach upon it.

The curved upper surface of the lugs 15 form cams enabling the fastener to be readily shoved into position, notwithstanding its frictional engagement. Thus, when the fastener is shoved edgewise across the arm A, the top of the lugs engage the under face of the arm and as the shoving action continues cam the portions 13 downwardly so that in the final position the resilience of such under portions causes the lugs to maintain an effective binding action on the arm.

It will be seen that it is a very simple matter to mount my fastener on the supporting arm and it may be readily shoved into place without requiring any special tools. When in place the engagement with the arm automatically locks the fastener in position. When in such position the opening 14 between the bottom portions, and the opening 16 in the top portion of the fastener register centrally with the opening a of the arm, so that a bolt may be readily passed through these openings and receive its nut by means of the tongues 17.

Figs. 1, 2 and 3 illustrate one use of my fastener, namely, on an arm of a clamping strap to provide a nut therefor. In these views A designates the strap which is shown as having an abrupt terminal arm portion a' and at the other end a continuing arm portion a—2, each arm being provided with a bolt opening a, these bolt openings being preferably of the same size in the two arms.

In Fig. 1, the fastening clip 10 is shown in position to be shoved onto the abrupt arm a' of the clamp. Fig. 2 illustrates such positioning of the fastener with the clamp embracing a conduit B and mounted on a suitable support C by means of a clamping screw D passing through the support, through arms of the clamp and the nut providing fastener.

In Fig. 3, I have shown my fastener 10 mounted on the other arm a—2 of the clamping strap and designed to accommodate a screw passing downwardly through the arm a', thence through the opening of the arm a—2. In such case the fastener is inverted from the position shown in Fig. 1 so that after passage down through the opening a of the arm a'—2 the screw finds its nut in the intermediate region of the fastener hidden from sight in Fig. 3.

The fasteners in Figs. 1 and 3 are identical and are mounted on either arm as desired. In each case the lugs 15 furnish the desired frictional engagement with the face of the arm adjacent the bolt hole to hold the fastener effectively in place. It follows from the construction shown that no enlargement of a normal bolt hole through the conduit strap or other arm is necessary, and as soon as my fastener is shoved onto such arm the strap is automatically provided with a nut to receive clamping bolt or screw.

I claim:

1. A fastener adapted for use with an article having an opening therein for receiving a bolt or the like, said fastener comprising a strip of sheet material bent on itself in two regions to provide an intermediate top portion and two bottom portions spaced from the top portion and separated from each other by an amount sufficient to admit said article, the bottom portions having their extreme ends recessed to provide a bolt-receiving opening, and each bottom portion back of the recess having an upwardly extending indentation to engage only the face of the article around the bolt-receiving opening therein, and the intermediate top portion being provided with an opening for the passage of a bolt or the like and having means thereon to engage the thread of a bolt passing therethrough.

2. A fastener comprising a strip of sheet metal doubled on itself in two regions to provide a top portion and two bottom portions spaced from the top portion, said fastener being adapted to receive an apertured flat arm between its top and bottom portions, the bottom portions being each formed with a recessed end and having an upwardly bowed part disposed sufficiently far from the recess to engage only the face of said arm beyond the confines of the aperture therein, and said top portion having an opening therein and being deformed adjacent the opening to provide a helical edge adapted to engage a threaded member passing through said aperture and opening.

3. A fastener comprising a strip of sheet metal having at least one end thereof bent backwardly upon itself and having a recess in the end thereof and being adapted to receive an apertured article therebetween, the end portion being deformed adjacent the recess to engage only the surface of the article outside the confines of the aperture therein, and said fastener having an opening adapted to register with said aperture and having a thread-engaging portion formed integral therewith adjacent said opening for engaging the thread of a bolt or screw that extends through the aperture and opening.

GEORGE A. TINNERMAN.